Patented Oct. 13, 1925.

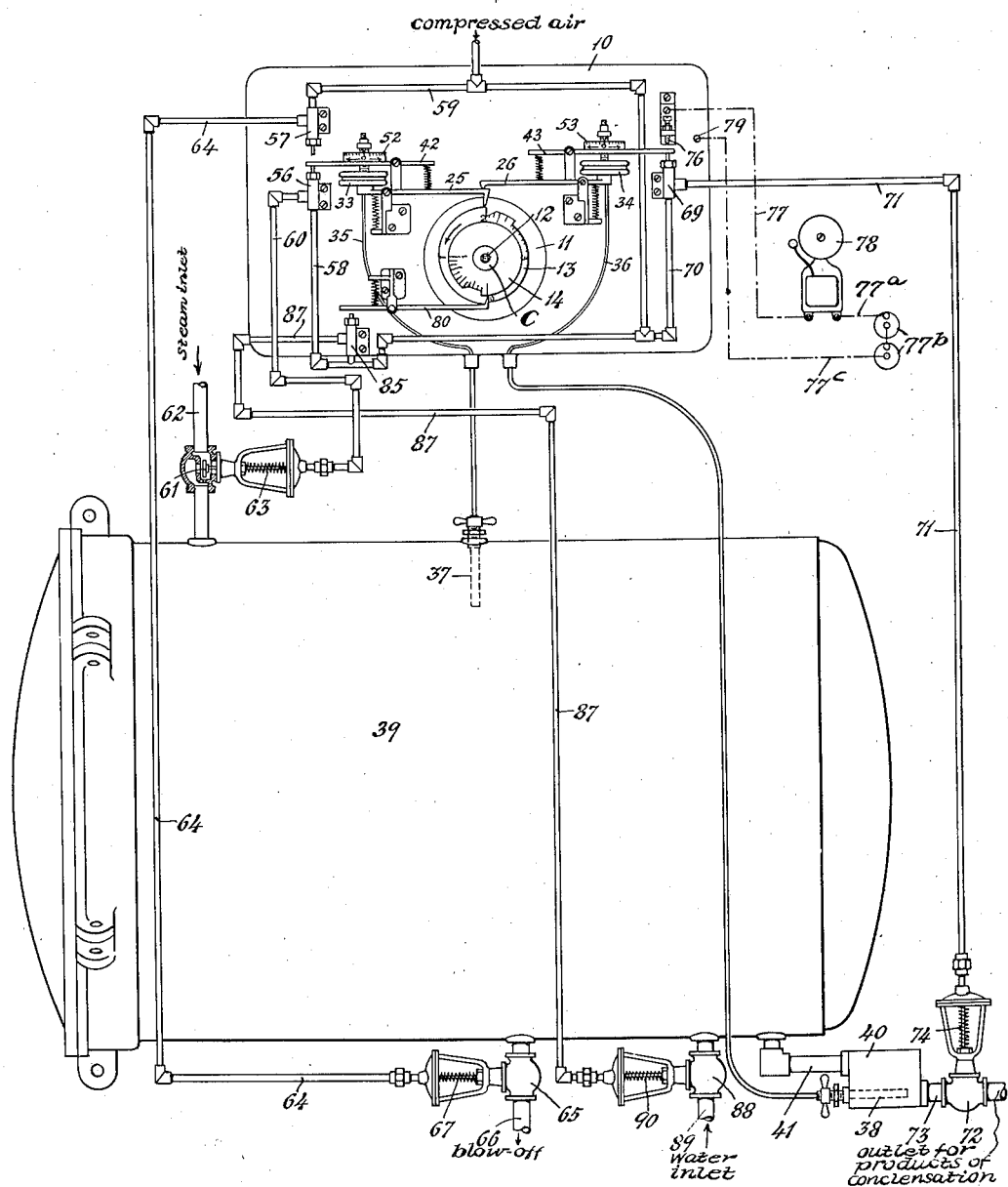

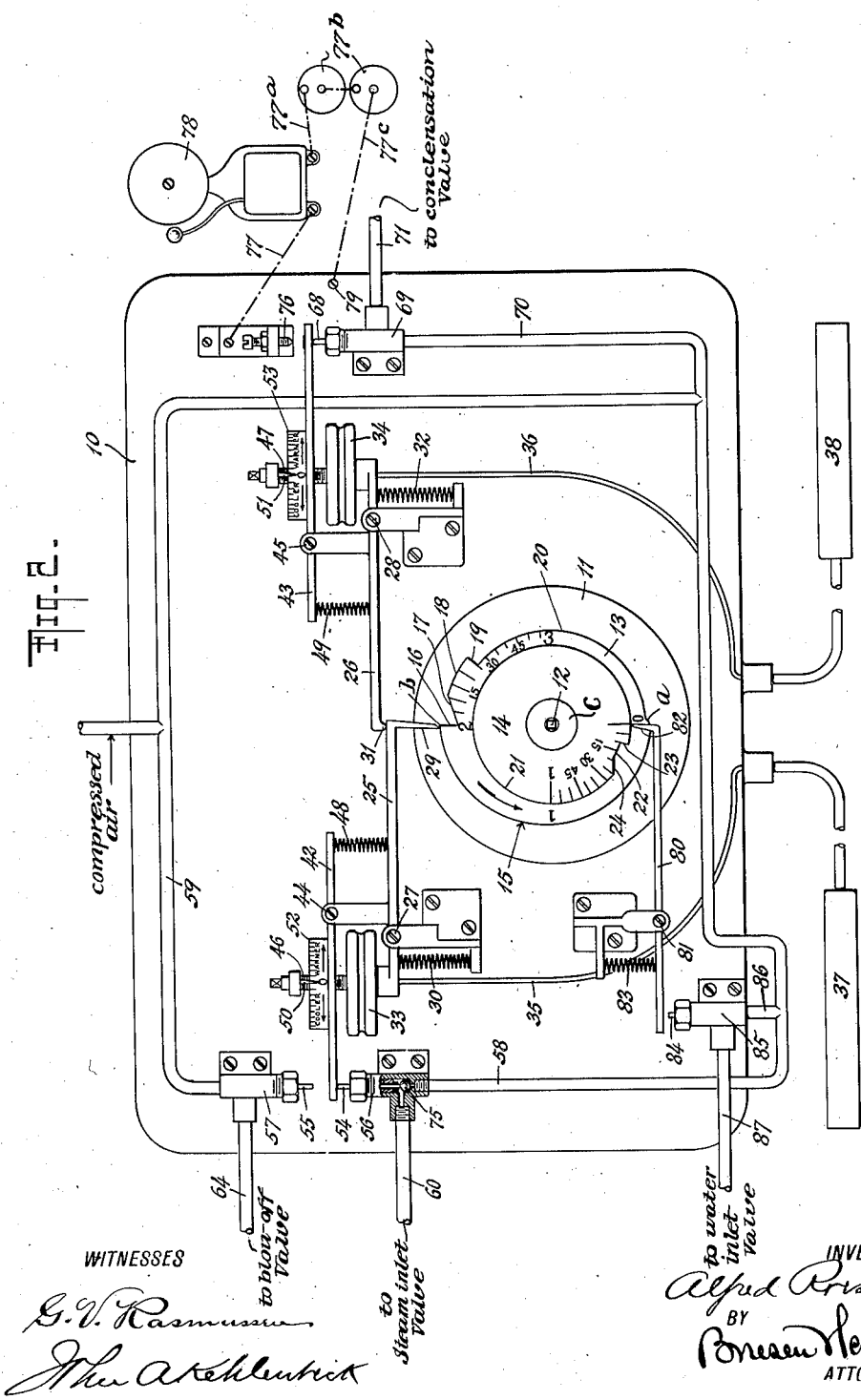

1,557,093

UNITED STATES PATENT OFFICE.

ALFRED ROESCH, OF BROOKLYN, NEW YORK, ASSIGNOR TO CHARLES J. TAGLIABUE MANUFACTURING COMPANY, OF BROOKLYN, NEW YORK, A CORPORATION OF NEW YORK.

CONTROLLING DEVICE.

Application filed February 21, 1920. Serial No. 360,470.

*To all whom it may concern:*

Be it known that I, ALFRED ROESCH, a citizen of the United States, and resident of the borough of Brooklyn, county of Kings, city and State of New York, have invented certain new and useful Improvements in Controlling Devices, of which the following is a specification.

My invention relates to automatic controlling devices and more particularly to that type thereof whereby predetermined conditions of temperature, pressure, etc., are automatically produced within a given period of time. The object of my invention is to provide a multiple device whereby a plurality of elements are automatically controlled in accordance with a predetermined plan of action and in proper sequence to automatically produce the results called for. Other more specific objects will appear from the description hereinafter and the features of novelty will be pointed out in the appended claims.

In the accompanying drawings an example of the invention is shown in operative combination with a vulcanizer, it being understood that this is simply for the purpose of illustration and description and without any intent to define the limits of said invention; in said drawings Figure 1 is a diagrammatic elevation of the device and the vulcanizer and Fig. 2 is an enlarged elevation, partly in section, of the device itself.

In its illustrated form, the device is operatively combined with a vulcanizer and is constructed and arranged to automatically provide therein a progressive increase of temperature over a period of two hours while coincidentally controlling the condensation during said period and at the end of said period to open a blow-off valve and sound an alarm and maintain said blow-off valve in its open position for a period of ten minutes and then to close said blow-off valve and open a cold water valve to admit cold water into the vulcanizer for a further period of fifteen minutes and then to close said cold water valve and again open the blow-off valve to permit the water to drain from the vulcanizer. This of course is only an example of the utility of the device and is not to be taken in any sense as a limitation of its field of usefulness, it being obvious that any variety of elements may be automatically controlled by said device in accordance with predetermined plans of action and in any number of different combinations.

The controlling device, as shown, comprises a supporting base or board 10, preferably constructed of metal, upon which a conventional clock-work 11 is mounted in any convenient manner, the spindle 12 of said clockwork carrying the necessary number of cams required for each particular case. In the present instance, two cams 13 and 14 are secured upon said spindle 12, the cam 13 being formed with an eccentric peripheral section 15 beginning at the starting point *a* and extending to a point *b* which is reached at the end of two hours in the operation of the device. A radial section 16 extends inwardly from the point *b* and connects with a peripheral section 17 which inclines outwardly from the section 16 and connects with a continuing concentric peripheral section 18; the section 17 is of a length which requires ten minutes to traverse in the operation of the device while the section 18 is of a length to be traversed in fifteen minutes. The section 18 terminates at an inwardly extending radial section 19 which in turn connects with a concentric section 20 extending back to the starting point *a* and being of lesser radius than the section 18. The cam 13 may be marked with a zero at the starting point *a* and with designations 1, 2 and 3 at intervals indicating the hours; in addition a scale properly marked and indicating five minute intervals may be located between the hour designations 2 and 3 and adjacent to the peripheral portions 17, 18, and 20 of the cam. The cam 14 is formed with a major concentric section 21 and a minor concentric section 22, the latter being connected with the former by a radial section 23 and an inclined section 24. The combined length of the sections 22 and 24 is such that fifteen minutes is required to traverse the same as will be more fully explained hereinafter, a suitable scale divided into five minute designations being located adjacent to the peripheral sections of said cam 14 and extending from zero to the one hour point thereon. The cam 14 is so positioned on the spindle 12 that its zero point registers with the zero and starting point *a* of the cam 13, in which position the sections 22 and 24 are diametrically opposite to the section 18 of the cam 13 as shown in Fig. 2.

The device includes further a pair of main levers 25 and 26 pivoted respectively at 27 and 28 upon the support 10, the lever 25 having its one end 29 maintained in engagement with the cam 13 by means of a spring 30 and the lever 26 having its one end 31 resting upon the lever 25 and maintained in this position by a spring 32. At their other ends the levers 25 and 26 carry capsular springs or their equivalents 33 and 34, which are connected through the medium of capillary tubes 35 and 36 with thermostatic bulbs 37 and 38, respectively. In the present instance the bulb 37 extends into a vulcanizer 39 so as to be susceptible to the temperature conditions therein while the bulb 38 is located in a chamber 40 which is connected with said vulcanizer 39 by a pipe 41 and receives the products of condensation therefrom. Auxiliary levers 42 and 43 are pivotally mounted at 44 and 45 upon the main levers 25 and 26 and carry adjustable screws 46 and 47 which are maintained in contact respectively with the capsular springs 33 and 34 by means of springs 48 and 49. To facilitate the adjustment of these screws 46 and 47 for the purposes to be more fully set forth hereinafter, they may be provided with indicating pointers 50 and 51 which co-operate with suitable scales produced upon scale-members 52 and 53 fixed respectively upon the auxiliary levers 42 and 43.

The auxiliary lever 42 extends between stems 54 and 55 located respectively in the exhaust passages of valve casings 56 and 57 which have their inlet ends connected by means of pipes 58 and 59 with a source of compressed air. The outlet end of the casing 56 is connected by means of a pipe 60 with a diaphragm motor valve 61 which constitutes a steam valve and controls a pipe 62 whereby steam is conducted to the vulcanizer 39, said valve being maintained in and moved toward its open position by a spring 63. The outlet end of the casing 57 is similarly connected by means of a pipe 64 with a diaphragm motor valve 65 which comprises a blow-off valve and controls the blow-off pipe 66 leading from the vulcanizer 39, said valve 65 being maintained in and returned to its open position by a spring 67.

The auxiliary lever 43 projects over a stem 68 located in the exhaust passage of a valve casing 69 the inlet end of which is connected with the same source of compressed air by means of a pipe 70 and which has its outlet end connected by means of a pipe 71 with a diaphragm motor valve 72 controlling a pipe 73 leading from the condensation chamber 40. This valve 72 is maintained and returned to its open position by a spring 74.

Each of the valve casings 56, 57 and 69 which may be termed control valves contain a ball valve 75 which controls the exhaust passages and the inlet ends of said valve casings and is operated by the respective stems 54, 55 and 68 and the air pressure as will be more fully pointed out hereinafter.

An electrical contact member 76 is located in operative co-relation to the auxiliary lever 43 and constitutes one terminal of an electrical circuit and is connected by means of a wire 77 with an electric alarm 78 in the usual way, the latter in turn being connected by means of a wire 77$^a$ with one pole of a battery 77$^b$; the other pole of said battery is connected by means of a wire 77$^c$ with the other terminal 79 which itself is connected with the base 10. The latter through the medium of the means whereby the lever 43 is mounted upon said base 10 completes the circuit.

A lever 80 is pivoted at 81 upon the base 10 and has its one end 82 maintained in contact with the periphery of the cam 14 by means of a spring 83, the other end of said lever projecting over a stem 84 located in the exhaust passage of a valve casing 85. The inlet end of the latter is connected by means of a pipe 86 with the previously mentioned source of compressed air while its outlet end is connected, by means of a pipe 87 with a diaphragm motor valve 88 which constitutes a cold water valve and controls the pipe 89 whereby cold water is admitted to the vulcanizer 39. This valve 88 is maintained in and returned to its open position by a spring 90.

In the operation of the device the cams 13 and 14, if not already in the proper position, are set by being manually rotated for instance by means of a head *c* which may be provided for this purpose, until the zero or starting point *a* of the cam 13 is in registry with the end 29 of the main lever 25, said end being thus located upon the lowest portion of the eccentric section 15 of said cam; the main lever 26 because of its resting upon the main lever 25 assumes a corresponding adjustment. With the parts in this position the end 82 of the lever 80 engages the concentric section 21 of the cam 14 at a point about in registry with the designation 2 on the cam 13 and diametrically opposite the zero point.

With the above adjustment the stem 55 of the valve casing 57 and the stem 84 of the casing 85 are free from restraint so that the air pressure will force the ball-valves 75 of these two casings 57 and 85 against the ends of the exhaust passages thereof to close the same and will pass through the pipes 64 and 87 to the diaphragm chambers of the blow-off valve 65 and cold water valve 88 and thus close these valves against the tension of their springs 67 and 90. Because of the engagement of the end 29 of the main lever 25 with the section 15 of the cam 13, the auxiliary lever 42 exerts a pressure upon the valve stem 54 and thereby forces the co-operating ball valve 75 into the position shown in Fig. 2 in which the exhaust passage is open and the inlet end is closed. As a result of this the steam valve 61 is open under the influence of its spring 63. At the same time because of the engagement of the main lever 26 with the lever 25 the auxiliary lever 43 exerts a corresponding pressure upon the stem 68 so that for the same reasons and in the same manner the condensation valve 72 is also open under the influence of its spring 74. Either at this stage or previously the adjusting screws 46 and 47 are properly adjusted in accordance with the predetermined results desired, it being understood that the screw 47 is set a few degrees lower than the screw 46; the purpose of this will appear more fully further on in the description.

The supply of steam may now be turned on, for instance by manually opening a controlling valve, and passes by the open steam valve 61 into the vulcanizer 39 in which the temperature accordingly begins to rise. As soon as said temperature reaches the point represented by the cam section 15 in proximity to the starting point a and to which the screw 46 is set, the capsular spring 33 is expanded somewhat and accordingly exerts a pressure against said adjusting screw 46 and thereby moves the auxiliary lever 42 on its pivot 44. This movement of said auxiliary lever 42 is relative to the main lever 25, because both the capsular spring 33 and said auxiliary lever 42 are carried by said main lever 25, and is in a direction to compress the spring 48 and move the end of said auxiliary lever away from the stem 54. The latter being thereby relieved from restraint the air pressure forces the co-operating ball valve 75 against the exhaust passage and opens the inlet end of the casing 56 so that said air pressure passes through the pipe 60 and by acting upon its diaphragm moves the steam valve 61 toward its closed position and this decreases the supply of steam to the vulcanizer 39.

In the meantime, as the cam 13 is rotating in the direction of the arrows in Figs. 1 and 2 through the medium of the clockwork 11, the end member 29 is gradually riding up on the eccentric section 15 of said cam and thereby moves the main lever 25 on its pivot 27, the auxiliary lever 42 because it is carried by said main lever, partaking of this rocking movement thereof. Said auxiliary lever 42 thus exerts a pressure upon the stem 54 and thereby moves the co-operating ball valve 75 away from the end of the exhaust passage of the casing 56, which brings about a reduction of the air pressure entering the latter. The previously existing air pressure upon the diaphragm of the steam valve 61 is thus correspondingly reduced with the result that the latter is opened somewhat under the influence of its spring 63 whereby the supply of steam or its equivalent to the vulcanizer is increased. An increase of the temperature immediately results in the vulcanizer which causes a further expansion of the capsular spring, 33, and again moves the auxiliary lever 42 relatively to the main lever 25 and away from the stem 54. The latter being thereby again relieved from restraint, the air pressure forces the co-operating ball 75 against the end of the exhaust passage of said casing 56 and passes through the pipe 60 and again moves the valve 61 toward its closed position to again decrease the supply of steam to the vulcanizer.

This alternate actuation of the combined levers 25 and 42 and of the lever 42 relatively to the lever 25 continues as long as the end member 29 remains upon the cam section 15, the steam valve 61 being correspondingly actuated to alternately increase and decrease the supply of steam to the vulcanizer 39. The temperature in the latter thus gradually rises from the degree represented by the starting point a to the degree represented by the finishing point b during the two hours it takes the end member 29 to traverse the cam section 15.

It will be understood that the capsular spring 33 is expanded each time just far enough to check the temperature in the vulcanizer from going materially beyond the degree corresponding to the point on the cam section 15 at which the end member 29 happens to be located.

During the operations so far described the movements of the main lever 25 are communicated to the main lever 26 and are duplicated therein, so that the movements in which the levers 26 and 43 move as a unit correspond to the similar movements of the levers 25 and 42. The movements of the auxiliary lever 43 relatively to the lever 26 are brought about by the capsular spring 34 under the control of the bulb 38 in the condensation chamber 40 in the same way as previously described. The only difference in the operation of the two mechanisms follows from the difference in the adjustment of the two screws 46 and 47, the latter being set for a slightly lower temperature than the former so that the movements of the auxiliary lever 43 relatively to the main lever 26 always takes place at a slightly lower temperature than the corresponding movements of the lever 42 relatively to the lever 25. The condensate valve 72 is thus opened and closed in harmony with the movements of the steam valve 61, the valve 72 being opened to permit the escape of the products of condensation whenever the temperature of the latter falls slightly below that of the temperature desired in the vulcanizer at that particular time.

The end member 82 of the lever 80 has meanwhile simply been riding along the concentric section 21 of the cam 14 so that the said lever 80 accordingly remains inactive during this period.

When at the end of two hours the end member 29 drops from the cam section 15 to the cam section 17 the main lever 25 and with it the auxiliary lever 42 will be rocked on the pivot 27 in a direction to move the auxiliary lever 42 away from the stem 54. The latter being thus again freed from restraint pressure will force the co-operating ball valve 75 into a position to close the exhaust passage and by passing through the pipe 60 to the diaphragm chamber of the steam valve 61 will close the latter and thus cut off the supply of steam to the vulcanizer. The extent of the rocking movement is sufficient to cause the lever 42 to move the stem 55 inwardly whereby the pressure through the pipe 64 will be cut off and the diaphragm of the blow-off valve 65 will be relieved so that the blow-off valve, by the action of its spring 67 will be opened; the steam or its equivalent which has previously reached the vulcanizer will thus be quickly blown off through the pipe 66. As the main lever 26 and auxiliary lever 43 are coincidentally rocked with the levers 25 and 42 the stem 68 is released, with the result that the condensation valve 72 is closed by the pressure which passes through the pipe 71. The described rocking movement is sufficient to bring the lever 43 into engagement with the terminal 76 whereby the electrical circuit 77 is closed and the alarm 78 is sounded.

The cam 13 continuing its rotation, the end member 29 will ride up on the cam section 17 and will finally at the end of ten minutes reach the section 18. The levers 25 and 42 and 26 and 43 will thereby be rocked in return directions to move the lever 42 away from the stem 55 and the lever 43 away from the terminal 76. The restraint upon the stem 55 being in this manner removed the pressure again becomes effective upon the diaphragm of the blow-off valve 65 and thus closes the same, a period of ten minutes having expired between the opening and closing of said blow-off valve 65. At the same time the removal of the lever 43 from engagement with the terminal 76 breaks the circuit 77 and thereby discontinues the alarm. Because of the lesser radius of the concentric cam section 18 the return rocking movements of the levers 25 and 26 are not sufficient to bring the auxiliary levers 42 and 43 back into contact with the stems 54 and 68 respectively. In other words at this stage the levers 42 and 43 are held midway between the stems 54 and 55 and between the stem 68 and terminal 76 respectively so that the blow-off valve 65 and condensation valve 72 remain closed.

At the moment the end member 29 reaches the concentric section 18 of the cam 13, the end member 82 will pass from the major section 21 of the cam 14 to the minor section 22 thereof, thereby rocking the lever 80 on its pivot 81 and causing it to bear against the stem 84. The cooperating ball valve 75 is accordingly caused to shut off the pressure to the casing 85 and to open the exhaust passage thereof, whereby the diaphragm of the cold water valve 88 is relieved and said valve is opened by its spring 90 to permit cold water to flow into the vulcanizer 39. As the cam 14 continues to rotate the end member 82 will ride along the cam section 22 and climb up on the section 24 and will finally again reach the section 21. The traversing of the sections 22 and 24 takes fifteen minutes and finally brings about a return rocking of the lever 80 which releases the stem 84 and permits the pressure to again reach the diaphragm of the cold water valve 88 which in consequence is again closed. During the fifteen minutes in which the end member 82 is traversing the sections 22 and 23 of the cam 14, the end member 29 is in contact with the section 18 of the cam 14. At the end of said period of fifteen minutes the end member 29 will drop to the cam section 20 and by again rocking the levers 25 and 42 will actuate the ball valve 75 in the casing 57 in a manner to open the exhaust passage and to thereby relieve the pressure in the pipe 64 and thus permit the spring 67 to open the blow-off valve 65; the collected water in the vulcanizer 39 is thereby permitted to drain therefrom through the blow-off pipe 66 which is the concluding step in the controlling operation under discussion. The cams 13 and 14 may then be reset to bring about a repetition of the various operations described or other cams with different operative characteristics may be substituted therefor.

The device is simple in construction and efficient in operation and is readily arranged for controlling any variety of elements necessary to the carrying out of different processes, the control being entirely automatic and free from any necessity for human supervision other than at the beginning and end of the given operations. That is to say the apparatus comprises a plurality of instrumentalities, as represented for instance by the control valves 56, 57, and 69 and a plurality of controlling elements exemplified by the cams 13 and 14 in combination with a clockwork 11 common to all of said cams, all arranged to bring about an automatic control in accordance with a predetermined time period program.

Thus for instance with the illustrated arrangement, the products of condensation are controlled in such a manner as not to affect the temperature in the vulcanizer which as a result is uniform and even throughout all parts of the vulcanizer; at the same time a quick cooling of the vulcanizer is brought about at the end of the operation whereby injury to the product due to high temperature continued beyond the intended point is avoided and thereby facilitates the handling of the moulds and material by cooling them. In other processes the same advantageous results are automatically attained with my improved device.

Various changes in the specific form shown and described and various substitutions therefor may be made within the scope of the claims without departing from the spirit of my invention.

I claim:

1. The combination of an element in which the internal conditions are to be controlled, means for regulating the flow to said element, of a fluid whereby changes in said internal conditions are effected, actuating means for actuating said regulating means in a predetermined manner to produce corresponding changes of internal conditions in said element, means for regulating the discharge from said element of a medium resultant from physical changes in said fluid, actuating means controlled by the medium to be discharged for actuating said discharge regulating means in a predetermined manner bearing a fixed relation to the operative actuation of said first named regulating means and time controlled mechanism common to both of said actuating means whereby the latter are operated to perform their predetermined functions in a given period of time.

2. The combination of an element in which the temperature is to be controlled, a conduit for conducting a medium to said element whereby the temperature therein is affected, means in said conduit whereby the flow of said medium is controlled, mechanism whereby the actuation of said controlling means is controlled in a predetermined manner, a member sensitive to temperature changes operatively combined with said element, a co-operating device carried by said mechanism so as to partake of the movements thereof and connected with said member to cause said mechanism to respond to temperature changes in said element, a second conduit for carrying away from said element, a medium resultant from said first-named medium, means in said second conduit for controlling the flow of said resultant medium, additional mechanism whereby the actuation of said second controlling means is controlled in a correspondingly predetermined manner bearing a predetermined fixed relation to the operative actuation of said first-named means, a second member extending into the path of said resultant medium, a second co-operating device carried by said additional mechanism so as to partake of the movements thereof and connected with said second member to cause said additional mechanism to respond to the temperature of said resultant medium and time controlled means common to all of said mechanisms whereby the latter are operated to perform their predetermined functions in a given period of time.

3. The combination of a vulcanizer in which the temperature is to be controlled, a steam line for introducing steam into said vulcanizer, a diaphragm motor valve in said steam line for controlling the flow of steam therethrough, mechanism whereby said diaphragm motor valve is actuated in a predetermined manner, a bulb sensitive to temperature changes operatively combined with said vulcanizer, an expansible and contractible member connected with said bulb for causing said mechanism to respond to temperature changes in said vulcanizer, a discharge line for carrying away from said vulcanizer the products of condensation, a second diaphragm motor valve in said discharge line for controlling the discharge of said products of condensation, additional mechanism whereby said second diaphragm motor valve is actuated, in a correspondingly predetermined manner bearing a fixed relation to the operative actuation of said first diaphragm motor valve, a second bulb sensitive to temperature changes extending into the path of the products of condensation, a second expansible and contractible member connected with said second bulb for causing said additional mechanism to respond to the temperature of said products of condensation, and time controlled means common to all of said mechanisms whereby the latter are operated to perform their predetermined functions in a given period of time.

4. The combination of an element in which the temperature is to be controlled, means for regulating the flow to said element, of a medium whereby the temperature therein is affected, actuating means for actuating said regulating means in a predetermined manner to produce corresponding variations of temperature in said element, auxiliary means whereby a second medium counteracting the action of the first medium is automatically introduced into said element and time controlled mechanism common to said actuating means and said auxiliary means, whereby said actuating means is caused to perform its predetermined functions in a predetermined period of time and said auxiliary means is caused to function at the end of said given period of time.

5. The combination of a vulcanizer in which the temperature is to be controlled, a steam line for introducing steam into said vulcanizer, a diaphragm motor valve in said steam line for controlling the flow of steam therethrough, actuating mechanism whereby said diaphragm motor valve is actuated in a predetermined manner for a given period of time, a bulb sensitive to temperature changes operatively combined with said vulcanizer, an expansible and contractible member connected with said bulb for causing said mechanism to respond to temperature changes in said vulcanizer, auxiliary means whereby cooling water is automatically introduced into said vulcanizer at the end of said given period of time to arrest the heating effects of said steam therein, and time controlled mechanism common to said actuating mechanism and said auxiliary means whereby said mechanism and means are operated.

6. The combination of an element in which the temperature is to be controlled, means for regulating the flow to said element, of a medium whereby the temperature therein is affected, means for actuating said regulating means in a predetermined manner for a predetermined period of time to produce corresponding variations of temperature in said element, means for regulating the discharge from said element of a medium resultant from said first-named medium and means for actuating said discharge regulating means for the same given period of time, in a predetermined manner bearing a fixed relation to the operative actuation of said first-named regulating means, and means whereby a medium counteracting the action of said temperature affecting medium is automatically introduced into said element at the end of said given period of time.

7. The combination of a vulcanizer in which the temperature is to be controlled, a steam line for introducing steam into said vulcanizer, a diaphragm motor valve in said steam line for controlling the flow of steam therethrough, mechanism whereby said diaphragm motor valve is actuated in a predetermined manner for a given period of time, a bulb sensitive to temperature changes operatively combined with said vulcanizer, an expansible and contractible member connected with said bulb for causing said mechanism to respond to temperature changes in said vulcanizer, a discharge line for carrying away from said vulcanizer the products of condensation, a second diaphragm motor valve in said discharge line for controlling the discharge of said products of condensation, additional mechanism whereby said second diaphragm motor valve is actuated, for the same given period of time, in a correspondingly predetermined manner bearing a fixed relation to the operative actuation of said first diaphragm motor valve, a second bulb sensitive to temperature changes extending into the path of the products of condensation and a second expansible and contractible member connected with said second bulb for causing said additional mechanism to respond to the temperature of said products of condensation and means whereby cooling water is automatically introduced into said vulcanizer at the end of said given period of time to arrest the heating effects of said steam therein.

8. The combination of an element in which the temperature is to be controlled, a conduit for conducting a medium to said element whereby the temperature therein is affected, means in said conduit whereby the flow of said medium is controlled, mechanism whereby the actuation of said controlling means is controlled in a predetermined manner, a member sensitive to temperature changes and affected by said element and connected to said mechanism whereby same responds to temperature changes in said element, a second conduit for conducting a secondary medium derived from said first mentioned medium away from said element whereby the temperature therein is also affected, a second means in said second conduit whereby the flow of said secondary medium is controlled, an auxiliary mechanism whereby the actuation of said second controlling means is coincidentally controlled in a predetermined manner, a second member sensitive to temperature changes and affected by said secondary medium, and connected to said auxiliary mechanism whereby same responds to temperature changes in same secondary medium, and time controlled means common to said two mechanisms whereby the latter are caused to perform their functions in a given period of time.

9. The combination of an element in which the temperature is to be controlled, a conduit for conducting a medium to said element whereby the temperature therein is affected, means in said conduit whereby the flow of said medium is controlled, main mechanism whereby the actuation of said controlling means is controlled in a predetermined manner, a member sensitive to temperature changes and affected by said element and connected to said mechanism whereby same responds to temperature changes in said element, a second conduit for conducting a secondary medium derived from said first mentioned medium away from said element whereby the temperature therein is also affected, a second means in said second conduit whereby the flow of said secondary medium is controlled, an auxiliary mechanism whereby the actuation of said second controlling means is coincidentally controlled in a predetermined manner, a second member sensitive to temperature changes and affected by said secondary medium, and connected to said auxiliary mechanism whereby same responds to temperature changes in said secondary medium and a second auxiliary mechanism whereby the actuation of said second controlling means is further controlled and time controlled means common to said main mechanism and said two auxiliary mechanisms whereby said main and first auxiliary mechanisms are caused to perform their functions in a given period of time and said second auxiliary mechanism is caused to function at the end of said predetermined period of time.

10. The combination of an element in which the temperature is to be controlled, a conduit for conducting a medium to said element whereby the temperature therein is affected, means in said conduit whereby the flow of said medium is controlled, mechanism whereby the actuation of said controlling means is controlled in a predetermined manner for a given period of time, a member sensitive to temperature changes and affected by said element and connected to said mechanism whereby same responds to temperature changes in said element, a second conduit for conducting a secondary medium derived from said first mentioned medium away from said element whereby the temperature therein is also affected, a second means in said second conduit whereby the flow of said secondary medium is controlled, an auxiliary mechanism whereby the actuation of said second controlling means is coincidentally controlled in a predetermined manner for the same period of time, a second member sensitive to temperature changes and affected by said secondary medium, and connected to said auxiliary mechanism whereby same responds to temperature changes in said secondary medium, a third conduit for conducting an auxiliary medium to said element whereby the temperature therein is also affected, a third means in said conduit whereby the flow of said auxiliary medium is controlled and a second auxiliary mechanism whereby the actuation of said third controlling means is effected at the end of predetermined periods of time.

11. The combination of an element in which the temperature is to be controlled, a conduit for conducting a medium to said element whereby the temperature therein is affected, means in said conduit whereby the flow of said medium is controlled, mechanism whereby the actuation of said controlling means is controlled in a predetermined manner for a given period of time, a member sensitive to temperature changes and affected by said element and connected to said mechanism whereby same responds to temperature changes in said element, a second conduit for conducting a secondary medium derived from said first mentioned medium away from said element whereby the temperature therein is also affected, a second means in said second conduit whereby the flow of said secondary medium is controlled, an auxiliary mechanism whereby the actuation of said second controlling means is coincidentally controlled in a predetermined manner for the same period of time, a second member sensitive to temperature changes and affected by said secondary medium, and connected to said auxiliary mechanism whereby same responds to temperature changes in said secondary medium, a second auxiliary mechanism whereby the actuation of said second controlling means is further controlled at the end of predetermined periods of time, a third conduit for conducting an auxiliary medium to said element whereby the temperature therein is also affected, a third means in said conduit whereby the flow of said auxiliary medium is controlled and a second auxiliary mechanism whereby the actuation of said third controlling means is effected at the end of predetermined periods of time.

12. The combination of a plurality of instrumentalities each performing an independent function, a plurality of controlling elements controlling said instrumentalities and a clockwork including a spindle on which all of said controlling elements are directly and positively fixed in predetermined relation whereby said controlling elements are operated in accordance with a predetermined time period program.

13. The combination of a plurality of control valves each performing an independent control function, a plurality of cams controlling said valves in predetermined relation and a clockwork including a spindle on which all of said cams are directly and positively fixed in predetermined relation and whereby said cams are actuated in accordance with a predetermined time period program.

14. The combination of a plurality of diaphragm-motor valves, a plurality of control valves controlling the operation of said diaphragm-motor valves, a plurality of cams controlling said control valves in predetermined relation and a clockwork including a spindle on which all of said cams are directly and positively fixed in predetermined relation and whereby said cams are actuated in accordance with a predetermined time period program.

15. The combination of a controlling cam, a clockwork for actuating the same in a predetermined period of time, a plurality of mechanisms controlled by said cam and each including a thermo-sensitive element and a plurality of thermo-sensitive devices independently connected with said thermo-sensitive elements for individually controlling said mechanisms independently of said cam.

In testimony whereof I have hereunto set my hand.

ALFRED ROESCH.